United States Patent [19]

Kotlyar

[11] Patent Number: 4,953,595
[45] Date of Patent: Sep. 4, 1990

[54] MUD PULSE VALVE AND METHOD OF VALVING IN A MUD FLOW FOR SHARPER RISE AND FALL TIMES, FASTER DATA PULSE RATES, AND LONGER LIFETIME OF THE MUD PULSE VALVE

[75] Inventor: Oleg Kotlyar, Salt Lake City, Utah

[73] Assignee: Eastman Christensen Company, Salt Lake City, Utah

[21] Appl. No.: 349,777

[22] Filed: May 10, 1989

Related U.S. Application Data

[63] Continuation of Ser. No. 79,092, Jul. 29, 1987, abandoned.

[51] Int. Cl.$^5$ .............................. F16K 3/02
[52] U.S. Cl. .................. 137/624.13; 137/625.31
[58] Field of Search .................. 137/624.13, 625.31

[56] References Cited

U.S. PATENT DOCUMENTS

| | | | |
|---|---|---|---|
| 1,986,252 | 1/1935 | Conran | 137/625.31 X |
| 3,273,592 | 9/1966 | Deubler et al. | 137/624.13 |
| 3,645,289 | 2/1972 | Schmitt | 137/625.31 X |
| 4,360,040 | 11/1982 | Cove et al. | 137/625.31 X |

Primary Examiner—Arnold Rosenthal
Attorney, Agent, or Firm—Arnold, White & Durkee

[57] ABSTRACT

Pulse rates, rise and fall times of pulses and lifetimes of mud pulsing valves are substantially increased by providing a valve with a plurality of openable ports which simultaneously open and close to provide a collective flow path of the mud through the valve. By employing a plurality of ports, instead of one port, the time rate of change in the flow area, as the plurality of ports opens and closes, is substantially greater in the case of a single port. As a result, mud velocity falls much more quickly and the abrasion damage within the mud valve is less. The rate of change of the flow area on opening and closing is further increased by providing noncircular ports. In particular, trapezoidal ports are utilized so that they open across a corresponding straight edges. A plurality of such trapezoidal ports may be utilized to increase the rate of change of flow area with time to an even greater extent. The number of ports may be substantially multiplied by utilizing a center fed stator with an upper and lower surface and opposing upper and lower rotors through which the ports are defined.

8 Claims, 5 Drawing Sheets

MUD PULSE VALVE AND METHOD OF VALVING IN A MUD FLOW FOR SHARPER RISE AND FALL TIMES, FASTER DATA PULSE RATES, AND LONGER LIFETIME OF THE MUD PULSE VALVE

This is a continuation of application Ser. No. 079,092, filed July 29, 1987, now abandoned.

BACKGROUND OF THE INVENTION

1. Field of the Invention

The invention relates to a method and apparatus for transmitting signals from the bottom of a well bore to the surface by means of mud pressure pulses generated within the hydraulic flow in the drill string.

2. Description of the Prior Art

The desirability and need for telemetry systems for transmitting information while drilling downhole through the mud column in the drill string has long been recognized. Equipment and procedures for control and monitoring of mud flow parameters are widespread and readily understood in the industry. Therefore, the use of propagating mud pulses through the drill string for the purpose of communicating information from the down hole location while drilling to the well's surface is also widely used and understood.

Prior art mud pulsing devices are generally classified in one of two categories. Either, the device generates positive pressure pulses or increases of pressure within the drill string over a defined basal level, or generates negative pressure pulses or decreases of the pressure for the drill string. Le Peuvedic, et al., *"Hydraulic Controlled Device For Modulating the Mud"*, U.S. Pat. No. 3,737,843, is an example of a positive pulsing mud valve. A needle valve is mechanically coupled to a piston motor in Le Peuvedic. The needle valve acts against a fixed seat. The piston motor in turn receives the continuous flow of control fluid. Information is transmitted to the surface in the form of rapid pressure variations ranging from 5 to 30 bars and succeeding one another at intervals of 1-30 seconds. Each pressure pulse is generated by reversing an electric current passing through a solenoid coil which is coupled to the needle valve.

Arps, "Earth Well Borehole and Logging System", U.S. Pat. No. 2,925,251, is also directed to a positive pulse telemetry system. A current pulse is applied to a magnet of a control valve. Activation of the valve by the magnet causes an increase in pressure in a cavity outside the valve body. The valve body fluxes and propagates a pressurized signal into the mud stream. Thus, Arps shows a positive pressure pulse system which is operated by several valves.

Spindler, *"Pilot Operated Mud Pulse Valve"*, U.S. Pat. No. 3,958,217, is also directed to a positive mud pulse telemetry system. In the absence of the generation of mud pulses, the mud flows through an upstream collar through a valve into an annular passage. Mud flows through interior passageways parallel to the main mud stream past a pilot valve seat and through a number of passages to rejoin the main mud flow. Therefore, by actuation of the bypass of valving, positive mud pulses can be generated in the main flow.

Gearhart, et al., *"Downhole Signaling System"*, U.S. Pat. No. 3,964,556, is yet another example of a positive mud pulse telemetric system.

Westlake, et al., *"Method of and Apparatus for Telemetry Information From a Point in a Well Borehole to the Earth's Surface"*, U.S. Pat. No. 4,780,620, shows a negative mud pulse system. A motor driven valve is open in response to binary signals generated by an package downhole. Upon opening a portion of the mud flow is allowed to escape from the drill string to the annulus between the drill string and borehole.

However, each of the prior art valves subject the valving element to high pressure, high flow rate abrasive drilling mud. The problem is particularly exacerbated in valving where the mud flow must be fully stopped and started. The result is predictably low cycle lifetimes and high maintenance, even where the valving elements are composed of a hardened composition. The problem is inherent to the application since some type of valve element must be exposed to the moving mud in order to stop and start the mud flow.

Therefore, what is needed is a valve design and method for valving which is not susceptible to the highly abrasive effects of the drilling mud pumped therethrough and which provides a faster data rate.

BRIEF SUMMARY OF THE INVENTION

The invention is a mud pulsing valve comprising a body, a stator disposed within the body, and a rotor rotatively disposed within the body and rotatable relative to the stator. The stator has a plurality of stator ports defined therethrough. The rotor has a plurality of rotor ports defined therethrough. Each stator port corresponds with at least one rotor port. The stator ports are arranged and configured within the stator in an analogous geometric configuration to the configuration that the rotor ports are arranged and configured within the rotor. Thus, a predetermined rotation of the rotor relative to the stator causes simultaneous opening and closing of the stator and rotor ports. The stator and rotor port are opened when the stator port and rotor port are at least partially aligned with each other, and the stator and rotor port are closed when no portion of the stator port overlaps any portion of the rotor port.

As a result, opening and closing of the stator and rotor ports causes the rate of flow area through the valve to increase and decrease respectively at an increased magnitude thereby causing faster rise and fall times of pulses generated by the mud pulse valve and longer lifetime of the valve.

The valve further comprising a mechanism for rotating the rotor relative to the stator through the predetermined rotation.

In one embodiment the number of the plurality of stator ports is equal to the number of the plurality of rotor ports.

However, in an alternative embodiment, the number of the plurality of stator ports and the number of the plurality of rotor ports is unequal.

When the number of stator and rotor ports are unequal, the number of the plurality of stator ports is related to the number of the plurality of rotor ports in that a multiple of the number of the plurality of one type of the stator or rotor ports equals the number of the other type of port.

In one embodiment the stator ports and the rotor ports have an identical size and shape.

In another embodiment the stator ports and the rotor ports have an identical shape but different size.

In another embodiment the stator ports and rotor ports have different sizes and shapes. For example, in one embodiment the rotor ports are a modified circular shape with two opposing semicircular lands extending into the port, while the stator ports are full circles.

In still another embodiment the stator ports and rotor ports have an identical size but different shape.

For example in one embodiment the rotor ports and stator ports are identically sized circular ports.

However, in another embodiment the stator ports and rotor ports are noncircular in shape. For example, the stator ports and rotor ports are each trapezoidal in shape. The trapezoidal stator ports and trapezoidal rotor ports have an identical size and shape in one embodiment.

More generally, the stator ports and rotor ports have a geometrical shape such that when the rotor is rotated past the stator, the overlapping geometrical shape of each stator port and rotor port increases at a rate greater than the rate of increase characterized by overlapping circular shapes of the same area.

In still another embodiment the stator and the rotor have at least two separate opposing surfaces and wherein the plurality of stator ports and rotor ports are defined through each of the two separate opposing surfaces of the stator and the rotor. The rotor includes an upper and lower surface through which the rotor ports are defined and wherein the stator includes an upper and lower surface through which the stator ports are defined.

The invention is also characterized as a method for modulating mud flow within a mud pulsing valve at an increased pulse rate comprising the steps of simultaneously aligning a plurality of ports within the valve to open the valve. The ports communicate with passages defined through the valve to permit flow of mud through the valve. The method continues with the step of simultaneously and selectively misaligning the plurality of ports within the valve to at least partially close the valve and at least partially restrict flow of mud through the passages within the valve.

As a result, the rate of change of flow rate through the valve when the valve opens and closes is substantially increased as compared with an analogous valve having a single port.

In the step of aligning the plurality of ports the ports are fully aligned to permit maximum flow through the valve.

In the step of simultaneously misaligning the plurality of ports, the ports are fully misaligned to completely stop the flow of mud through the valve.

In one embodiment in the steps of aligning and misaligning, align and misalign respectively corresponding trapezoidally shaped ports. The trapezoidal ports have a major axis of the trapezoidal shape. The step of aligning and misaligning the trapezoidal ports comprises the step of aligning and misaligning respectively the trapezoidal ports in a direction transverse to the major axis of the trapezoidal shape.

Typically the steps of simultaneously selectively aligning and misaligning the ports selectively aligns and misaligns respectively ports having an equal cross-sectional area. The steps of aligning and misaligning the ports aligns and misaligns respectively ports of identical shape.

However in another embodiment, the steps of aligning and misaligning the plurality of ports aligns and misaligns respectively ports of unequal cross-sectional area.

The invention is still further characterized as an improvement in a method for opening and closing a port within a mud pulsing valve comprising the steps of moving a first port relative to a second port into an overlapping configuration to open the valve and into a nonoverlapping configuration to close the valve. Each of the ports has at least one edge defining the port within the valve with a radius of curvature substantially greater than an equivalent circular port defined as a hypothetical circular port having an equal cross-sectional area to the port. Movement of the ports relative to each other moves the one edge of each of the ports apart from each other in a transverse direction as determined by rotation of one port with respect to the other port about a center of rotation within the mud valve.

The step of moving the edge rotates generally straight edges of each of the ports with respect to each other.

In the step of moving the ports a plurality of ports are simultaneously moved with respect to each other.

The invention and its various embodiments will be better understood by now turning to the following drawings.

The invention and its various embodiments may be better understood by now turning to the following detailed description.

DETAILED DESCRIPTION OF THE PREFERRED EMBODIMENT

Pulse rates, rise and fall times of pulses and lifetimes of mud pulsing valves are substantially increased by providing a valve with a plurality of openable ports which simultaneously open and close to provide a collective flow path of the mud through the valve. By employing a plurality of ports, instead of one port, the time rate of change in the flow area, as the plurality of ports opens and closes, is substantially greater than in the case of a single port. As a result, mud velocity falls much more quickly and the abrasion damage within the mud valve is less. The rate of change of the flow area on opening and closing is further increased by providing noncircular ports. In particular, trapezoidal ports are utilized so that they open across a corresponding straight edges. A plurality of such trapezoidal ports may be utilized to increase the rate of change of flow area with time to an even greater extent. The number of ports may be substantially multiplied by utilizing a center fed stator with an upper and lower surface and opposing upper and lower rotors through which the ports are defined.

Figure 1:
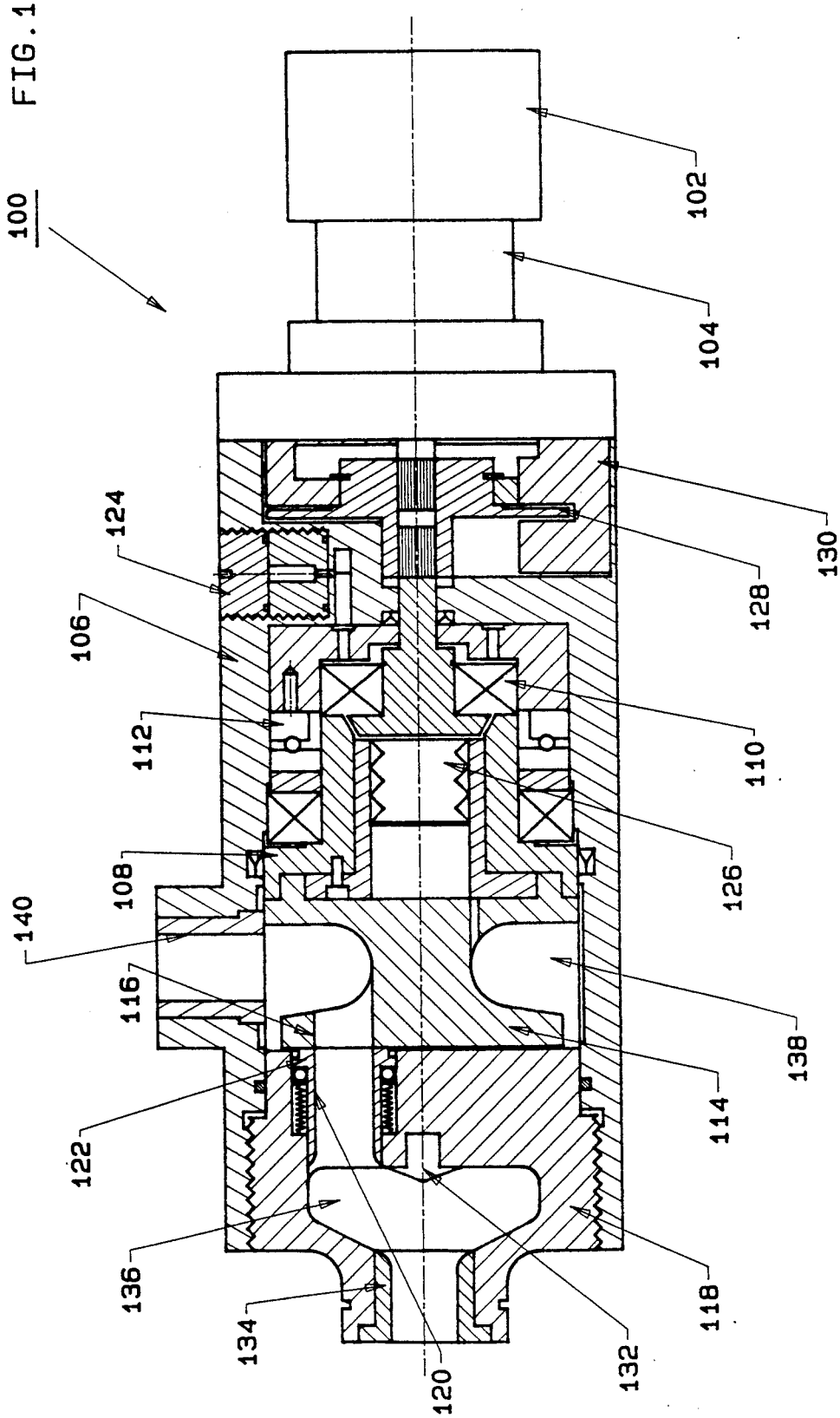
FIG. 1 is a diagrammatic cross-sectional view of a negative mud pulse valve.

FIG. 1 is a diagrammatic cross-sectional view of a negative mud pulse valve. The valve, generally denoted by reference numeral 100 is a multi-port venting valve which is capable of an increased data or pulsing rate and a significantly greater service life. In the illustrated embodiment, the valve of FIG. 1 has a data rate at least three times higher than analogously driven conventional mud pulsing valves and a longer service life due to the significantly decreased time, during which the valve is exposed to the high mud flow velocity. The valve will be shown and described as a negative pulsing valve, but may be used with appropriate design modifications in a universal or multistate system such as described in the copending application, Ser. No. 845,938 entitled "Universal Mud Pulse Telemetry System", and filed on Mar. 31, 1986, assigned to the same assignee as the present application and incorporated herein by reference.

Valve 100 is comprised of a conventional valve motor 102, such as an electrically driven motor, coupled to the mechanical portion of the valve through a conventional gear box 104 shown in side elevational view in FIG. 1. The details of gear box 104 and motor 102 have no particular relevance to the invention and are therefore not shown or discussed in any detail.

Valve 100 is further comprised of a valve body 106 which houses a valve shaft 108. Shaft 108 is coupled through gear box 104 to motor 102. Shaft 108 is supported within housing 106 by means of radial bearings 110 depicted diagrammatically in FIG. 1 and a thrust, ball bearing 112. A rotor 114 is rigidly connected to shaft 108 and includes a plurality of valve ports 116, one of which is shown in the side sectional view of FIG. 1. In the illustrated embodiment three such identical ports are provided. The shape of ports 116 is generally circular.

Returning to FIG. 1, rotor 114 is disposed in a substantially sealed relationship with a fixed stator 118. The rotation of rotor 114 is sensed by a code wheel 128 which is splined to shaft 108 and whose rotation is sensed within a conventional sensor assembly 130. The stator 118 is similarly provided with three correspondingly circularly shaped ports 120, each port provided with a spring loaded, shear seal 122 for providing a sealing engagement with rotor 114. The center of stator 118 is provided with a protective flow deflector 132 which is composed of an expendable and abrasive resistant material.

All the bearings within valve 100 to the right of rotor 114 in FIG. 1 are provided with a lubricating fluid or oil under pressure through a conventional pressurized oil duct system 124 in combination with a pressure compensation bellows 126.

In order to protect the bearings of valve 100 from the abrasive effects of the drilling mud, the bearing cavities are filled with oil and compensated by bellows 126 which balances the ambient pressure against the pressure of the oil within the bearing cavities. A rubber diaphragm could be easily substituted in place of bellows 126. In any case, bellows 126 is resilient and is characterized by a spring constant which creates a slightly positive pressure on the oil in the bearings. Thus, to the extent that there is any leakage from the bearings, the leakage is from the bearings to other cavities within the valve and not vice versa.

Alternatively, the bearings within valve 100 could be protected by extending the air cavity of gear transmission 104 to include the bearing space around shaft 108. In such a case, the construction and design of valve 100 would be modified to provide a journalled seal between shaft 108 and rotor 114 which would be sealed by a high pressure sealing device, such as a 20,000 psi seal sold under the trademark POLYPAK by Parker Hanifin Corp. In either case, either through positive air-to-mud sealing or a positive oil pressure in excess of the mud pressure, the bearings within valve 10 are isolated from the abrasive mud which flows through valve 100.

Code wheel 128 and sensor 130 are arranged and configured with each other so as to either completely misalign rotor 114 with respect to stator 118 so that stator ports 120 and rotor ports 116 do not even partially overlap, or to align ports 120 of stator 118 and ports 116 or rotor 114 so that there is complete overlap between these opposing ports. Inasmuch as there are three stator ports 120 and three rotor ports 116 in the illustrated embodiment, rotor 114 need be rotated only through 60 degrees to move from a fully misaligned (closed) to a fully aligned (open) position. Conventional position sensors are used in sensor 130 such as Hall effect sensors or the like.

Therefore, for each rotation of rotor 114 three pulses will be generated. Mud flows through an axial input port 134 into a receiving chamber 136 above stator 118. When rotor 114 and stator 118 are aligned, the mud then flows through aligned ports 120 and 116 into rotor cavity 138 and thence through output channel 140. Typically, the output flow is directed to the annular space between the drill string and bore hole to create a negative pulse.

Therefore, it may be readily appreciated that the valve is capable of a pulse repetition rate three times higher than conventional mud pulsing valves which have a single port in the stator and rotor with one pulse being created with every motor rotation. It can also further be readily appreciated that the pulse rate may be increased even further providing additional numbers of ports 120 and 116. For example, it is contemplated that in another embodiment of the invention six stator ports 120 and six rotor ports 116 would be provided to create a mud pulse rate for every motor revolution twice as high as that shown for the embodiment of FIG. 1 and six times higher than achieved by conventional mud pulse valves.

One of the major causes for valve wear is the abrasion which occurs on the shear seals 122 within stator ports 120. Much of the abrasion on shear seals 122 arises from the high velocity of the abrasive drilling mud to which shear seals 122 are subjected as stator port 120 just as they are opened or closed. In the case of a conventional valve with a single openable port, the entire mud flow through the valve occurs in the first few moments of the valve's opening and in a region adjacent to a very small segment of shear seal 122. This results in a spurt of high pressure, high velocity abrasive mud flowing past a proximate segment of shear seal 122. Simply stated the abrasive mud is nozzled for a brief moment through the crack opened between the sheer seal and the opposing rotor port as the valve opens. A similar phenomenon occurs as the valve closes.

However, when the number of ports is increased in the embodiment of FIG. 1, the rate of flow area which becomes available (the derivative of the flow area taken against time or angular rotation of the rotor) as the valve opens and closes is much higher than in the case where a single port is provided. As a result, the velocity of abrasive mud flowing past small circumferential segments of shear seals 122 within stator ports 120 decreases much more quickly in the case of a multiple channel valve than in the case of a single channel valve regardless of the shape of the port. This is graphically illustrated in FIG. 5.

Figure 5:
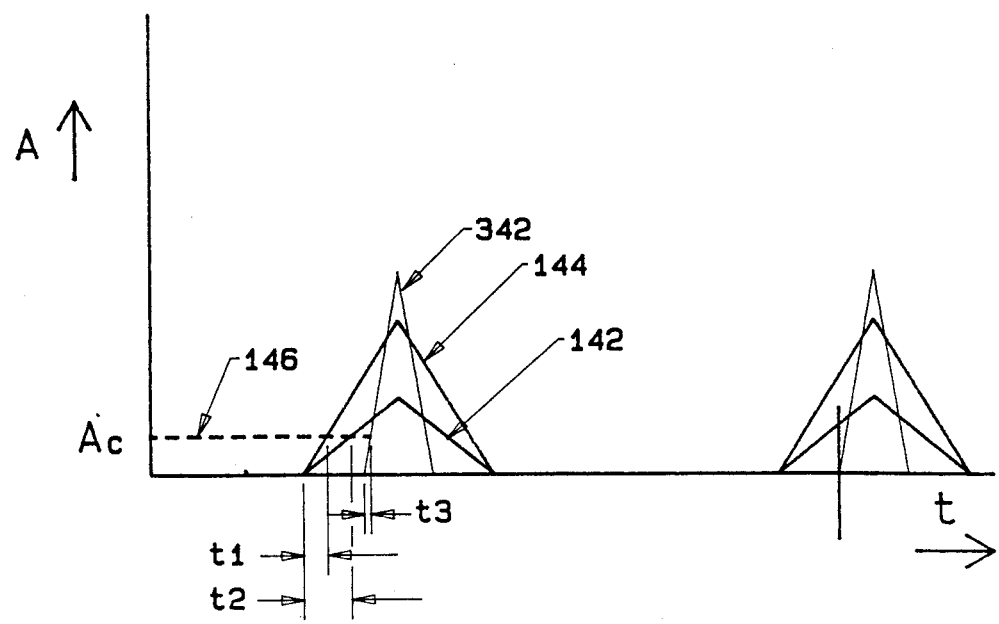
FIG. 5 is a highly diagrammatic graph in which the vertical axis represents the total amount of flow area which is available for passage of drilling mud through the valve while the horizontal axis represents time.

FIG. 5 is a graph in which the vertical axis represents the total amount of flow area which is available for passage of drilling mud through valve 100 while the horizontal axis represents time. Curve 142 diagrammatically represents the flow area which is available in a single channel prior art valve. Thus as valve 100 is cycled, there is a periodic, generally triangular flow area waveform which is generated. However, in the embodiment of FIG. 1 where three instead of one port are simultaneously opened and closed, the flow area waveform is represented by curve 144 which is not only a much larger flow area but is characterized by leading and trailing edges which have a much higher time slope than conventional flow area waveform 142 (typically three times higher). Since the velocity of drilling mud through the port or ports within a mud valve vary approximately inversely to the total amount of flow area, the time, t1, for which shear seals 122 are subjected to a destructively high mud flow velocity, which is diagrammatically depicted as corresponding to flow area level 146, is substantially less in the case of curve 144, than in the case of curve 142, namely t2. In the case of three ports with the same diameter as a single port embodiment, the time t1 = (t2)/3.

Figure 2:
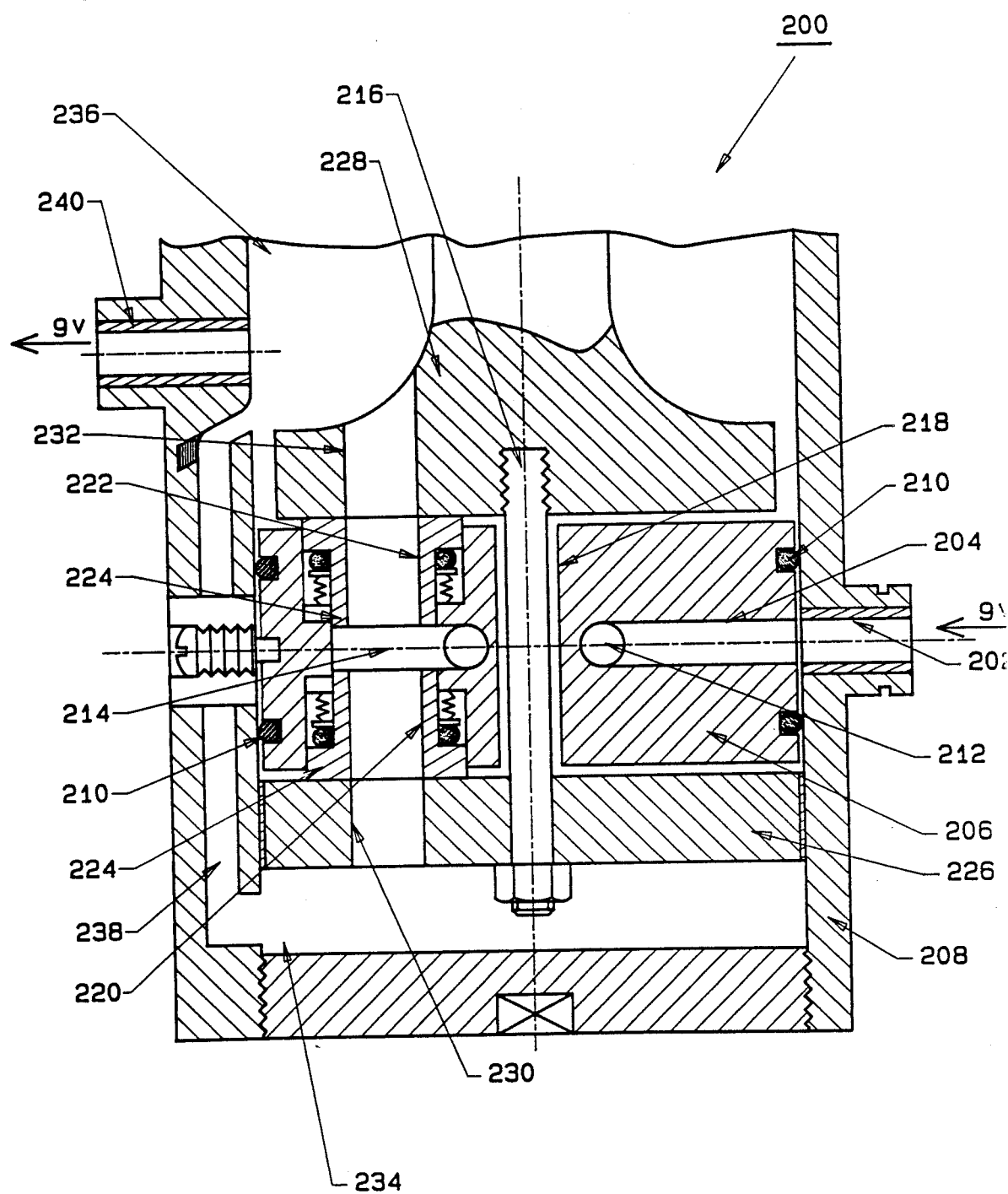
FIG. 2 is a cross-sectional view of a second embodiment wherein even longer life span and faster pulses are achievable than in the case of the embodiment of FIG. 1.

Turn now to a second embodiment as depicted in FIG. 2 wherein even longer life spans are achievable than in the case of the embodiment discussed in connection with FIG. 1. In the case of the valve of FIG. 2, generally denoted by reference numeral 200, hydraulic mud flows through inlet 202 into a central bore 204 defined in stator 206. Stator 206 is disposed in a sealed relationship to a valve body 208 by means of O-rings 210. Hydraulic mud flows through bore 208 into a toroidal manifold 212 and thence into a distribution manifold 214. An axial stud bolt 216 is disposed through an axial corresponding bore 218 defined in stator 206. Bore 218 is defined through the center of toroidal manifold 212.

Once drilling mud is provided under pressure to manifold 214 it is then dispersed through a plurality of ports, generally denoted by lower stator ports 220 and upper stator ports 222. In the illustrated embodiment of FIG. 2 there are three lower stator ports 220 and three upper stator ports 222. Each stator port 220 or 222 is provided with a spring loaded shear seal 224 similar to shear seals 122 of the embodiment of FIG. 1. Opposing shear seals 224 and upper and lower stator ports 220 and 222 is a corresponding lower rotor 226 and upper rotor 228. Lower rotor 226 and upper rotor 228 are rigidly coupled together by means of stud bolt 218 and hence rotate with each other in a unitary fashion.

Upper rotor 228 is coupled to appropriate bearings, coding wheels, transmissions and motors in a conventional manner or similar to that shown in connection with FIG. 1. Both lower rotor 226 and upper rotor 228 have a corresponding plurality of rotor ports 230 and 232 respectively defined therethrough. Lower rotor ports 230 correspond to lower stator ports 220 while upper rotor ports 232 correspond to upper stator ports 222. The shape, size and relative placement of the rotor ports 230 or 232 correspond to the size, shape and relative placements of corresponding stator ports 220 and 222, respectively.

Mud exits lower rotor ports 230 and flows into a valve chamber 234. Similarly, mud exits upper ports 232 and collects in an upper valve chamber 236. Mud from lower chamber 234 communicates with upper chamber 236 by at least one longitudinally communicating passage 238 and preferably through a plurality of passages. Drilling mud then exits valve chamber 236 through an outlet port 240 to be utilized in a manner similar to the mud output from port 140 of the embodiment of FIG. 1.

It may be readily appreciated by viewing FIG. 5 in light of the above description that given the same rotor rpm, number of ports per rotor and size of ports as between the embodiment of FIG. 2 and the embodiment of FIG. 1, the total flow area available on each opening and closing of the rotor and stator ports is twice as great in the embodiment of FIG. 2 than in the embodiment of FIG. 1. More simply, every time stator ports 222 and 220 are opened or closed, six such ports are opened or closed compared to three ports in the embodiment of FIG. 1.

As discussed above, the rate of change of the flow area for a given rpm of the rotors is even greater in the embodiment of FIG. 2 than in FIG. 1.

Figure 3:
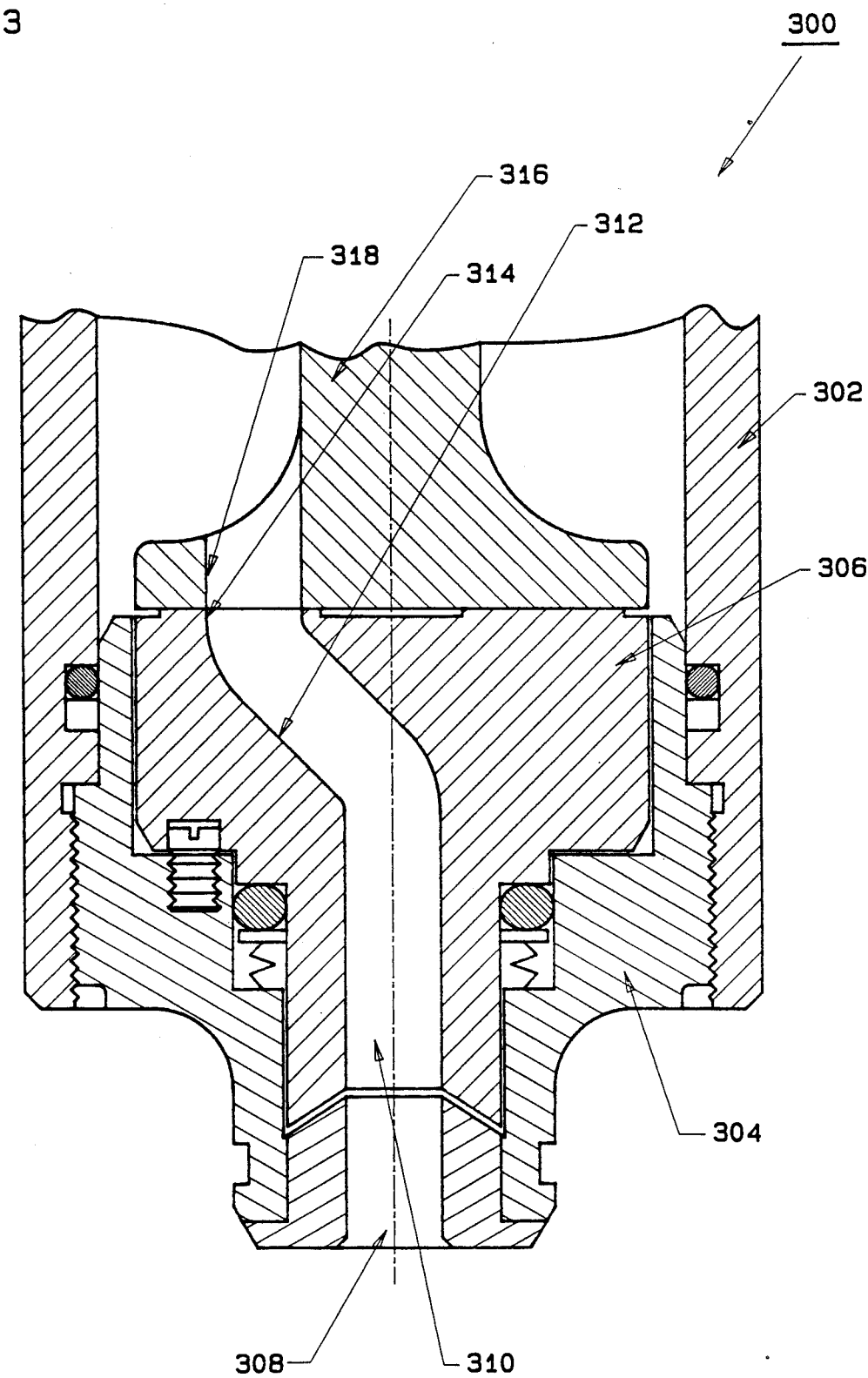
FIG. 3 is a sectional side view of a third embodiment wherein a mud pulse valve is shown in a design without shear seals, and wherein higher pulse rates or data rates are achievable than in the case of the embodiment discussed in connection with FIGS. 1 and 2.

Turn now to the embodiment of FIG. 3 wherein a mud pulse valve is shown in a design without shear seals. The valve, generally denoted by reference numeral 300, is shown in side sectional view in FIG. 3 as comprised of a valve body 302 threaded to a collar 304. Disposed within collar 304 in a sealed relationship is a stator 306 having six ports and channels defined therein, one of which is shown in FIG. 3. For example, an axial input port 308 communicates with a manifold area 310 which is split into six angled and branched passages 312 terminating at the upper surface of stator 306 in a corresponding stator port 314.

Disposed in a rotating relationship against stator 306 is a rotor 316 which similarly has six identically shaped and sized stator ports 318 defined therethrough, one of which is shown in cross section in FIG. 3. Stator 306 is spring loaded within collar 304 to act as a unitary shear seal against rotor 316. Turn now to the plan view of FIG. 4 wherein the left hand side of the figure shows the upper portion of stator 306 and stator ports 314 and wherein the right hand portion shows a cutaway view of rotor 316 with rotor ports 318.

Figure 4:
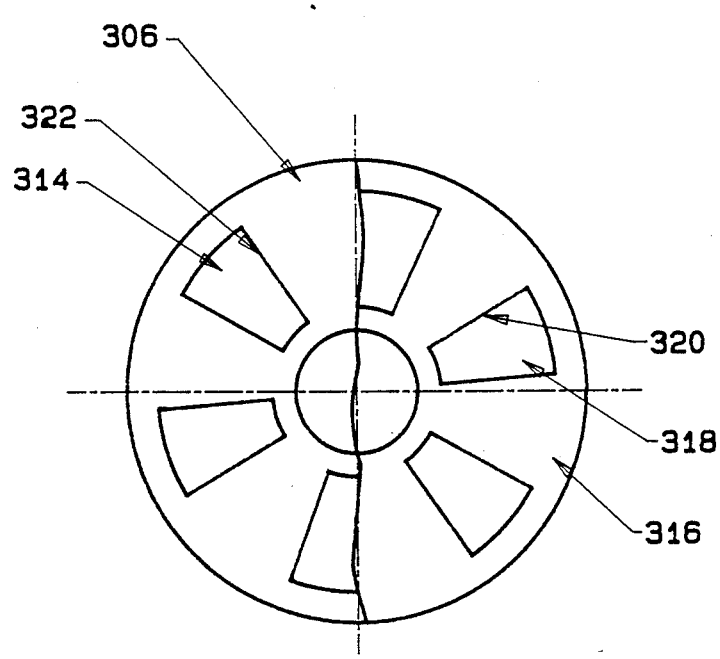
FIG. 4 is a plan view of the embodiment of FIG. 3 wherein the left hand side of the figure shows the upper portion of the stator and the stator ports, and wherein the right hand portion shows a cutaway view of the rotor with the rotor ports.

The ports in the embodiments of FIGS. 1 and 2 may be considered as circular ports. However, the ports in the embodiment of FIG. 3 are preferably trapezoidal sectors. As rotor port 318 begins to open to expose an opposing corresponding stator port 314, the overlapped area of the ports does not assume the shape of an increasing overlap of two circular geometric unions but rather a geometric union of a sectorial rhombus as depicted in FIG. 4.

Therefore, an edge 320 of a rotor port 318 clears an edge 322 of a stator port 314 along the entire length of their common radial edges 320 and 322 to form a growing sectorial trapezoidal overlap. Ports 314 and 318 thus open suddenly as compared to the relatively slower opening of overlapping circular ports and is best depicted in FIG. 5 as flow area waveform 342. The period of time in which the flow velocity is destructively high is exceedingly small and the total flow area waveform has a comparatively very sharp or fast slope so that the amount of time a destructive mud flow velocity is achieved through the ports becomes negligible.

Inasmuch as the increase of flow area also occurs at a faster rate, the pressure pulses which are produced similarly have higher rise and fall times and are easier to detect at the well surface.

Moreover, the trapezoidal or trapezoidal shape of the ports permit to implement the larger area of ports on a given bolt hole circle in comparison with circular ports, thereby significantly increasing the valve data rate.

The above embodiments have been described assuming an equal number of identically shaped and spaced stator and rotor ports. However, it is expressly included within the scope of the invention that the number of stator and rotor ports may be unequal and the ports may be of different cross-sectional area as well as shape. The cross-sectional depictions of the valves so modified will not materially vary from that depicted. Only the plan views will change depending on the combination of size, shape, number and plan arrangement of the stator and rotor ports. This variety of elements, namely the size, shape, number and plan arrangement of the stator and rotor ports, can be combined in a large number of possible or logical combinations to create multistate pulsing, or to vary the rate of change of mud flow upon the opening and closing of the valve as may be desired.

Figure 6A:
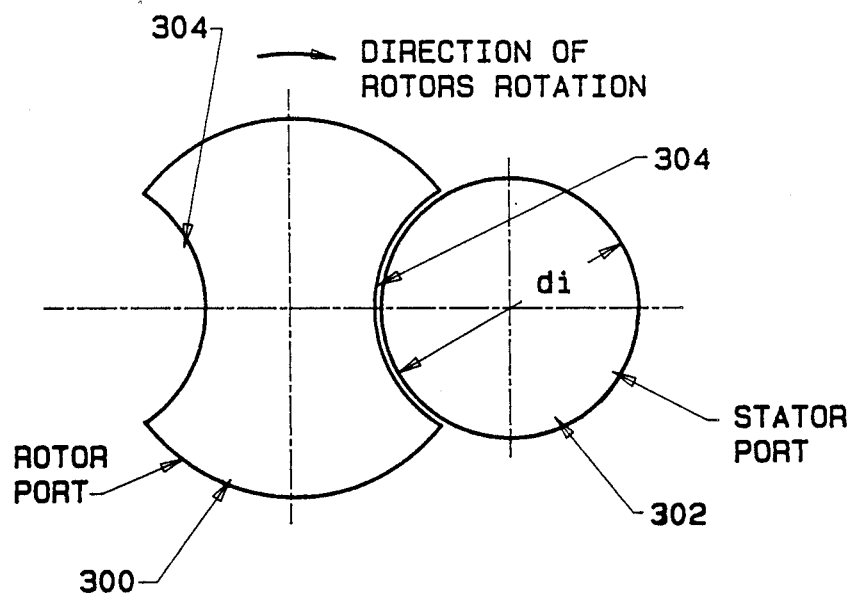
FIGS. 6a and 6b are diagrammatic plan views of a an alternative embodiment for the rotor and stator ports as seen in a fully, mutually misaligned and aligned condition respectively.
Figure 6B:
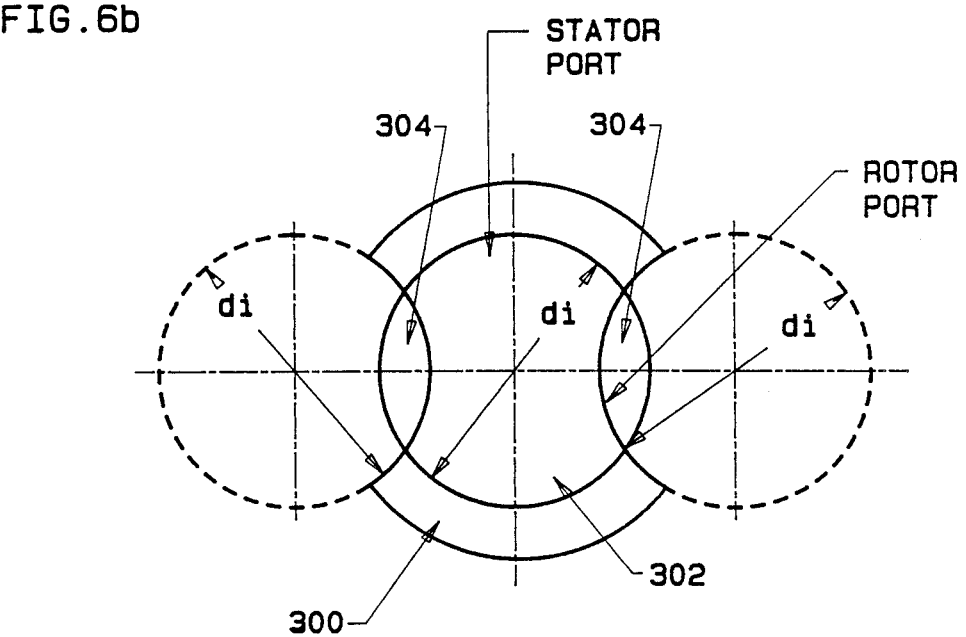

For example, FIG. 6a is a diagrammatic plan view of a rotor port 300 and a stator port 302 which are misaligned. In FIG. 6b is a diagrammatic plan view of rotor port 300 and stator port 302 after full mutual alignment. As depicted, both ports are generally circular, although rotor port 300 has a larger diameter than stator port 302 and is further modified by two diametrically opposing semicircular lands 304 which extend into the circular opening of rotor port 300. Lands 304 have a radius approximately equal to the radius of stator port 302 so that when the rotor and stator ports are moved with respect to each other the edge of land 304 of rotor port 300 opens relative to the opposing edge of stator port 302 at a very high rate. As a result very fast rise time are achieved giving a sharply defined pressure pulse with a very small time of high mud velocity in the close proximity of the port edges.

Many modifications and alterations may be made by those having ordinary skill in the art without departing from the spirit and scope of the invention. The illustrated embodiment has been set forth in highly diagrammatic form only to illustrate the broad principle of the invention and should not be taken as limiting the invention which is defined in the following claims.

I claim:

1. A mud pulsing valve, comprising: a body;
   a stator disposed within said body, said stator having at least two opposing surfaces, said stator having a plurality of stator ports therein, said stator ports extending between said opposing surfaces;
   a rotor rotatively disposed within said body and rotatable relative to said stator, said rotor having a plurality of ports defined therethrough, said rotor having first and second portions, a first portion proximate a first of said opposing surfaces of said stator and a second portion proximate the second of said opposing surfaces of said stator, said stator ports being cooperatively arranged and configured within said stator relative to said rotor ports in an analogous geometric configuration as said rotor ports are arranged and configured within said rotor, so that a predetermined rotation of said rotor relative to said stator causes simultaneous opening and closing of passages formed by said stator and rotor ports, one of said passages being opened when one of said stator ports and a rotor port are at least partially aligned with each other and said passage being closed when no portion of said one of said stator ports overlaps any portion of a rotor port;
   whereby the rotor ports extending through both opposing surfaces of said rotor substantially simultaneously aligned with the stator ports extending respectively through both opposing surfaces of said stator.

2. The valve of claim 1 wherein said stator ports and rotor ports are noncircular in shape.

3. The valve of claim 2 wherein said stator ports and rotor ports are each trapezoidal in shape.

4. The valve of claim 3 wherein said trapezoidal stator ports and trapezoidal rotor ports have an identical size and shape.

5. The valve of claim 1 wherein said stator ports and rotor ports have a geometrical shape such that when said rotor is rotated past said stator, the overlapping geometrical shape of each stator port and rotor port increases at a rate greater than the rate of increase characterized by overlapping circular shapes of the same area.

6. A mud pulsing valve, comprising:
   a body member;
   a stator disposed within said body, said stator having at least two opposing surfaces, said stator further having at least one stator port extending therethrough, said stator port communicating between said opposing surfaces;
   a rotor rotatably disposed within said body member and rotatable relative to said stator, said rotor having a first portion on a first side of said rotor and proximate a first of said two opposing stator surfaces and having a second portion on an opposing side of said stator and proximate the second of said opposing stator surfaces, said rotor having at least a first port in said first portion and a second port in said second portion, said first and second ports arranged and configured within said rotor so that a predetermined rotation of said rotor relative to said stator causes opening and closing of passages formed by said stator and at least one of said rotor ports, one of said passages being opened when one of said stator ports and a rotor port are at least partially aligned with each other and said passage being closed when no portion of said one of said stator ports overlaps any portion of a rotor port.

7. The mud pulsing valve of claim 6, wherein said first and second rotor ports are cooperatively arranged and configured relative to said stator ports such that a predetermined rotation of said rotor relative to said stator causes simultaneous opening and closing of passages between said stator ports and both of said first and second rotor ports.

8. The mud pulsing valve of claim 7, wherein said mud pulsing valve includes a fluid inlet, and wherein said fluid inlet communicates with said stator intermediate said two opposing surfaces of said stator.

* * * * *